United States Patent

[11] 3,603,383

| [72] | Inventors | Horst Michael;<br>Hans-Peter Schabert, both of Erlangen,<br>Germany |
|---|---|---|
| [21] | Appl. No. | 715,617 |
| [22] | Filed | Mar. 25, 1968 |
| [45] | Patented | Sept. 7, 1971 |
| [73] | Assignee | Siemens Aktiengesellschaft<br>Berlin and Munich, Germany |
| [32] | Priority | Mar. 25, 1967 |
| [33] | | Germany |
| [31] | | S 1 09 023 Ia/13g |

[54] STEAM GENERATOR, PARTICULARLY FOR PRESSURIZED WATER NUCLEAR REACTORS
6 Claims, 4 Drawing Figs.

[52] U.S. Cl. .................................................. 165/158,
165/162
[51] Int. Cl. ...................................................... F28f 9/02
[50] Field of Search ............................................ 165/83,
159, 184, 158, 162, 51

[56] References Cited
UNITED STATES PATENTS

| 1,894,753 | 1/1933 | Cahoon ...................... | 165/159 |
| 2,670,185 | 2/1954 | Schorner et al .............. | 165/83 |
| 3,180,405 | 4/1965 | Hinde ......................... | 165/184 |
| 3,183,967 | 5/1965 | Mettenleiter et al. ........ | 165/83 |

*Primary Examiner*—Charles Sukalo
*Attorneys*—Curt M. Avery, Arthur E. Wilfond, Herbert L. Lerner and Daniel J. Tick ABSTRACT: Steam generator particularly for pressurized water reactors includes an elongated pressure vessel, a bundle of heat exchanger tubes located in the vessel and extending substantially parallel to one another in the longitudinal direction of the vessel, and a pair of spaced-apart tube support plates mounted in the vessel and formed with recesses wherein respective ends of the tubes extend. The tubes are spaced from one another a distance that is only a fraction of the diameter thereof, and have a reduced diameter over a length thereof of several decimeters adjacent the tube support plates.

STEAM GENERATOR, PARTICULARLY FOR PRESSURIZED WATER NUCLEAR REACTORS

Our invention relates to steam generator, particularly for pressurized-water nuclear reactors.

Steam generators for nuclear reactors have very large structural components which have reached the very limit of feasibility with regard to their manufacture and transportation. This is particularly true for superheating steam generators of pressurized-water reactors which, due to their greater requirement for heating surfaces as compared to saturated steam generators, are very expensive, and for a desired output of 200 to 300 mw.e. (megawatts of electricity) are too heavy for rail transport. Practical difficulties are encountered in the manufacture thereof, above all because of the relatively large tube end-support plates, and are accompanied often with very disagreeable delays in delivery. In the event of a tube rupture, the large secondary water content of such large heat exchangers subject the reactor housing to an additional inner pressure. If the secondary flow is conducted in the interior of the heat exchanger tubes in the interest of providing a compact construction, part of the tubes yield wet steam so that the entire obtainable superheating is small.

It is accordingly an object of our invention to provide steam generator, particularly for pressurized-water nuclear reactors, which avoids the foregoing disadvantages of the heretofore known structures of this general type. It is more specifically an object of our invention to provide such steam generator as will have a relatively compact construction yet produce superheating of relatively high efficiency.

It is also an object of our invention to provide such steam generator which will reduce the disadvantages of the heretofore known structures of the same general type, particularly with regard to their feasibility of manufacture and transportation as well as to the production and transportation costs thereof.

With the foregoing and other objects in view, we provide in accordance with our invention, steam generator, particularly for pressurized-water nuclear reactors, comprising an elongated pressure vessel, substantially straight heat exchanger tubes disposed within the pressure vessel and connected in a bundle to respective tube plates located at opposite ends of the elongated pressure vessel. Specifically, according to the invention, the spacing between the heat exchanger tubes are only fractions of the diameter thereof, and the diameter of the heat exchanger tubes is reduced over a length thereof of several decimeters located adjacent the end portions thereof that are inserted in the tube plates. The flow velocity of the vaporizing secondary water between the heat exchanger tubes is thereby greatly increased and a relatively good heat transfer is produced in the regions of the heating surfaces which, due to the reduction in the moisture of the steam, are no longer wetted.

Other features which are considered as characteristic for the invention are set forth in the appended claims.

Although the invention is illustrated and described herein as embodied in steam generator, particularly for pressurized-water nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
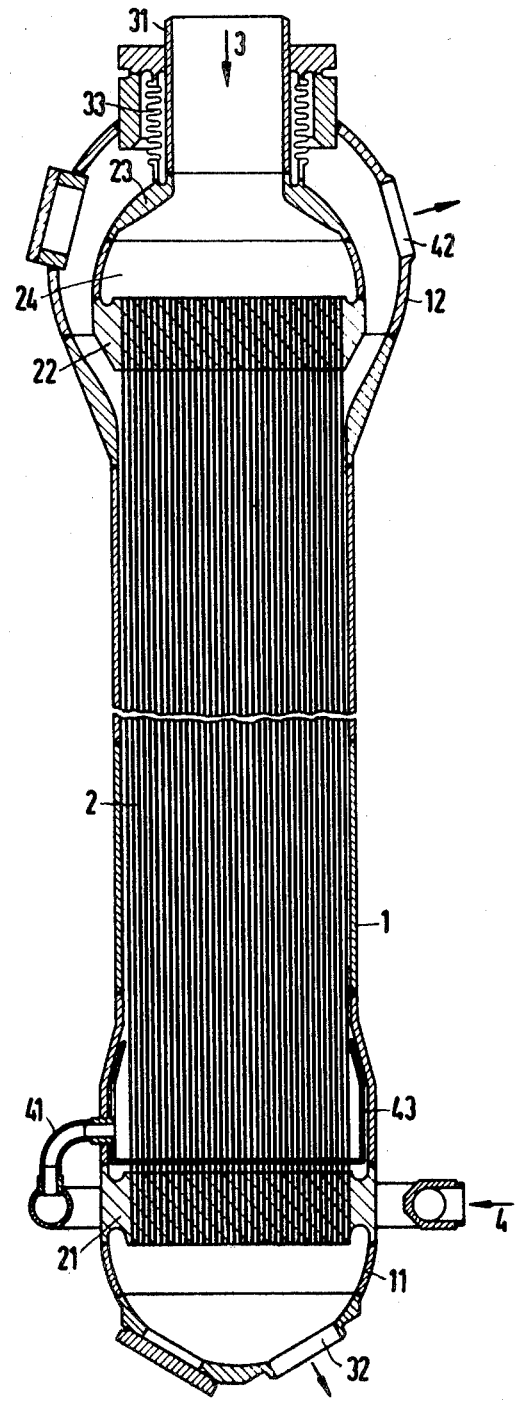
FIG. 1 is a diagrammatic longitudinal view, partly in section and partly broken away, of a steam generator constructed in accordance with our invention.

Referring now to the drawings and first particularly to FIG. 1 thereof, there is shown a pressure vessel having a cylindrical center portion 1 and a pair of opposite widened ends 11 and 12. In the interior of the pressure vessel, there are located heat exchanger tubes 2 tightly packed together (with a separation or spacing therebetween, for example, of 2 millimeters, each of the tubes having an outer diameter of 20 millimeters). The heat exchanger tubes 2 are inserted in suitable recesses provided in the tube end support plates located at both ends of the pressure vessel. The tubes 2 do not have the same thickness along the entire length thereof but rather are reduced in diameter starting at a location thereof several decimeters away from the end support plates so that therewith initially the boring of the recesses in the base of the tube end support plates, and the subsequent rolling of the tubes and, moreover, the back-and-forth flow of the secondary coolant transversely to the tubes is facilitated for a short distance adjacent the bases of the tube end support plates. The widening of the pressure vessel at both ends thereof also serves for this purpose.

The base 21 of the tube support plate is rigidly connected to the pressure vessel at the lower end of the latter. At the upper end of the bundle of straight tubes as shown in FIG. 1, the respective tube support plate base 22 is suspendedly mounted and is connected with a supply duct 31 by means of a collet which surrounds a distributor space 24 for the primary heat carrier 3. The supply duct 31 is intercepted or mechanically clamped outside the steam generator in a conventionally known manner so that expansion movements of the supply duct 31 cannot transfer any bending moment to the heat exchanger bundle 2 of tubes. The floating tube plate base 22 is sealed form the pressure vessel portion 12 with the aid of a folding bellows 33 or a stuffing box or packing gland. The supply duct 31 which is connected to the floating tube plate base 22 extends out of the pressure vessel in a sliding fit. By means of this construction, it is possible for the heat exchanger tubes to be stressed only in tension and thereby practically no dislocations or warping thereof can occur.

The narrow intermediate space between the individual tubes effect a particularly good heat transfer to the rapidly flowing secondary heat carrier which flows through the heat exchanger in a counterflow direction. The secondary heat carrier 4 flows through a supply tube 41 located in the vicinity of the tube plate base 21 into the pressure vessel and discharges therefrom through the opening 42. The outlet 32 of the primary heat carrier, on the other hand, is located on the inlet side of the secondary heat carrier 4.

Figure 2:
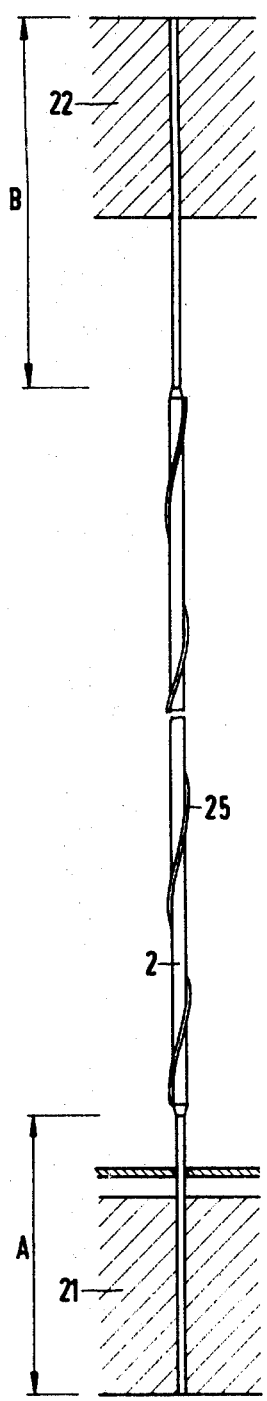
FIG. 2 is an enlarged longitudinal view of one of the heat exchanger tubes of the embodiment of FIG. 1 shown supported at the ends thereof by the tube plates.
Figure 3:
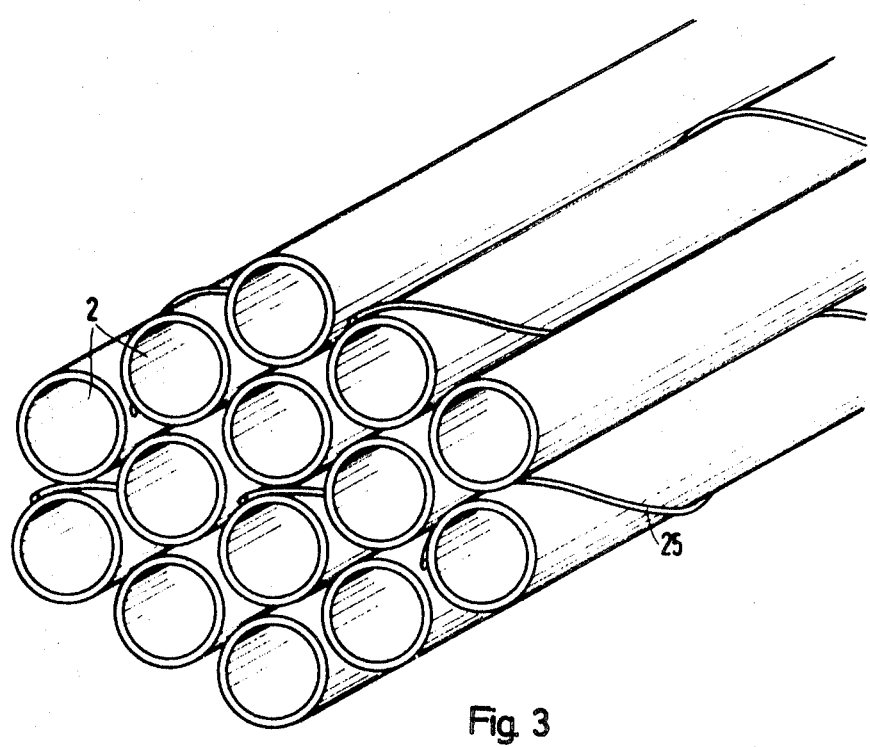
FIG. 3 is a much enlarged perspective view of a plurality of heat exchanger tubes of FIG. 2 showing spacers mounted thereon.
Figure 4:
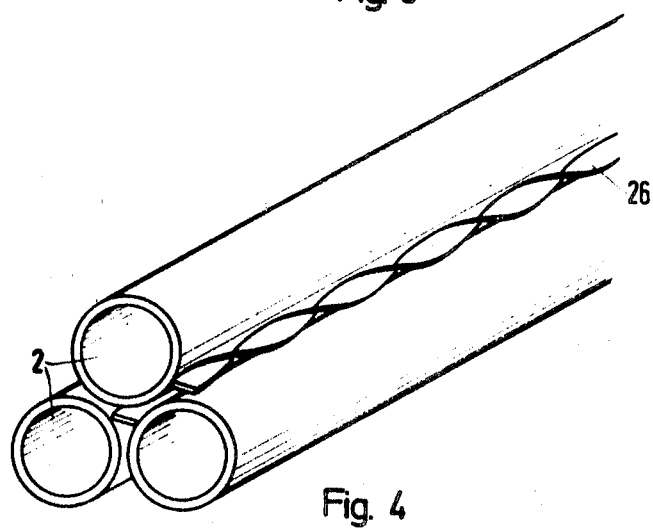
FIG. 4 is a similar view to that of FIG. 3 of a lesser number of heat exchanger tubes showing a different embodiment of the spacers in the form of twisted sheet metal strips located in the spaces intermediate the individual tubes.

From FIG. 2 which shows an individual heat exchanger tube, the connection thereof with the two tube plate bases 21 and 22 can be readily seen. Along the lengths A and B, the diameter of this heat exchanger tube is slightly reduced, for example from about 20 millimeters to 17 millimeters for a constant wall thickness. In order to hold the individual heat exchanger tubes 2 spaced from one another, they are, for example, helically wound with a wire 25 so that between the individual heat exchanger tubes 2 (FIG. 3), uniform spacing results therefrom. Simultaneously, these spacers serve for ensuring an effective whirling-about of the flow of the secondary heat carrier 4. Naturally, other types of spacers can be employed for this purpose such as, for example, are known from the technology of nuclear reactor fuel elements. An additional special form of spacer is shown in FIG. 4, and consists of a straight sheet metal strip which has been twisted and inserted in the intermediate spaces between the individual heat exchanger tubes. Also, by employing the spacers of FIG. 4, a trouble-free spacing is effected with simultaneous whirling-about of the secondary heat exchanger 4. A further spacing possibility is provided by using cylindrical rod spacers located between the tubes. Such cylindrical rods are provided with helical grooves, which are, however, entirely or partly absent therefrom in the preheater region so that in the preheater region the flow velocity is increased and the heat transfer is improved.

For a better understanding of the size of such a steam generator, it should be noted that a nuclear power plant having a power output of 600 mw.e. requires only two of such steam generators which have a length of about 25 m. (meters). The effective length of the tubes is about 19 m., the diameter thereof is about 20 mm. and the wall thickness thereof is about 1 mm. The number of heat exchanger tubes is about 7500, and the outer diameter of the cylindrical portion of the heat exchanger is about 2.2 m. The shipping weight of one of such steam generators is about 220 t. (tons), the combined weight of both steam generators being therefore, 440 t. Conventional steam generators having comparable output have a weight, however, which is in the order of magnitude of 600 t.

With regard to the manufacture of the heat exchanger tubes, it is noted that the diameter thereof can be reduced from 20 mm. to 17 mm. with, for example, pilgrim-type rolling mills or ballpeen hammers. Cold-hardening of the tubes which may have previously been applied thereto is enhanced by about 12 percent as a result of this diameter-reduction operation. Before being sweated, welded or fused into the suitably formed recesses of the bases of the tube end support plates, the narrowed tubes are rolled down and thereby cold-hardened for a third time. If the total deformation should thereby become too great, it is possible to soften the ends of the tubes by annealing in the vicinity of the rollers. In considering the additional length of the tube portions that are reduced in diameter, there need be no fear that the tube length having its original diameter of 20 mm., and which is highly stressed due to internal pressure, will thereby become greatly heated and lose any of its tensile strength.

It is also observed that the tube end support plates are thermally insulated from the supercooled feed water 4 in a conventional manner by sheet-metal layers 43. Manholes are provided and serve for inspecting the lower tube end support plate as well as the bellows 33. The upper tube end support plate can be made accessible by providing a nonillustrated manhole in a nonillustrated T-member or in an elbow of the primary flow tube system.

The wires 25 employed as spacers between the tubes are secured thereto by spot-welding, are wound thereon at a relatively high pitch of, for example, 400 mm. and provide for a relatively good intermixing on the steam side. There is barely any steam loss associated therewith. The coils of the wire 25 are installed on the tubes with little play therebetween so that a slight radial stressing is produced therein during operation of the reactor due to the somewhat greater thermal expansion of the heat exchanger tubes as compared to that of the pressure vessel wall. By suitable rotary orientation of the helical turns of wire 25 a weak spring-mounting of the tubes is achieved due to the bending of the wire in a direction transverse to the axis of the tubes, so that vibrations are eliminated, and, in spite of that fact, only weak lateral frictional forces can arise due to longitudinal displacement thereof.

The invention of this application is naturally not limited to the special structure of the pressure-guiding shaped components at the ends of the steam generator. Instead of the floating base of the tube end plate, a rigidly welded, fused, or sweat-fitted member can be employed if the relative thermal expansion of the tubes and the pressure vessel mantle or casing is carefully controlled, for example by selecting the tubes and casing of material having appropriate coefficients of thermal expansion or by increasing the temperature of the pressure vessel casing. This objective can be achieved by collecting the generated superheated steam below the tube end support plate 22 at the outer periphery of the pressure vessel and passing it downwardly within an annular space located between the bundle of tubes and the pressure vessel casing, the annular space being separated from the bundle of tubes by a thermally insulated partition (not shown). In such a case, the outlet for the steam is located in the lower half of the cylindrical pressure vessel casing.

Solely owing to the special shape of the heat exchanger of our invention and due to the compact arrangement of the heat surfaces therein, the production costs thereof are relatively small compared to those for comparable heat exchangers available in accordance with the present state of the art. An economic stimulus is thereby produced to increase the steam pressure of the secondary flow in pressurized water reactors to a value of 60 to 70 atma. (atmospheres absolute) and thereby to increase the total efficiency of the nuclear reactor plant. Moreover, due to the improvement in maintaining a constant temperature of the primary coolant for partial load, the volume of the pressure vessel can be kept small, so that a further cost saving is thereby realized indirectly from this novel steam generating construction of our invention.

We claim:

1. Steam generator particularly for pressurized-water reactors comprising an elongated pressure vessel, a bundle of heat exchanger tubes located in the vessel and extending substantially parallel to one another in the longitudinal direction of the vessel, and a pair of spaced-apart tube support plates mounted in the vessel and formed with recesses wherein respective ends of said tubes extend, said tubes being spaced from one another a distance that is only a fraction of the diameter thereof, and having a reduced diameter over a length thereof in the order of several decimeters adjacent said tube support plates.

2. Steam generator according to claim 1 wherein one of said end support plates has a base floatingly suspended in said pressure vessel.

3. Steam generator according to claim 1 wherein said pressure vessel has an outer casing, and said tube support plates are located at opposite ends of said pressure vessel, said pressure vessel being of widened construction at said ends thereof and having at said widened ends connections to a primary and a secondary fluid flow path passing through said bundle of heat exchanger tubes and openings formed in said pressure vessel casing at said widened ends.

4. Steam generator according to claim 1 including spacers located between adjacent tubes of said bundle, said spacers being in continuous engagement with said tubes along the entire length thereof between said lengths of reduced diameter, for spacing said tubes from one another so as to form a fluid flow path between said tubes.

5. Steam generator according to claim 4, wherein said spacers are formed of wires substantially helically wound on said tubes.

6. Steam generator according to claim 4 wherein said spacers are formed of twisted sheet-metal strips located in intermediate spaces between said tubes.